(12) United States Patent
Obaidi

(10) Patent No.: US 11,240,876 B2
(45) Date of Patent: Feb. 1, 2022

(54) MANAGING COMMUNICATIONS FOR CONNECTED VEHICLES USING A CELLULAR NETWORK

(71) Applicant: T-Mobile USA, Inc., Bellevue, WA (US)

(72) Inventor: Ahmad Arash Obaidi, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 59 days.

(21) Appl. No.: 16/721,744

(22) Filed: Dec. 19, 2019

(65) Prior Publication Data

US 2020/0128616 A1 Apr. 23, 2020

Related U.S. Application Data

(63) Continuation of application No. 15/476,871, filed on Mar. 31, 2017, now Pat. No. 10,548,184.

(51) Int. Cl.
*H04W 84/18* (2009.01)
*G07C 5/00* (2006.01)
(Continued)

(52) U.S. Cl.
CPC ............ *H04W 84/18* (2013.01); *B60W 30/08* (2013.01); *B60W 40/04* (2013.01); *B60W 40/10* (2013.01); *B60W 40/12* (2013.01); *G07C 5/008* (2013.01); *G07C 5/0808* (2013.01); *G08G 1/0112* (2013.01); *G08G 1/0133* (2013.01); *G08G 1/0141* (2013.01); *G08G 1/0962* (2013.01); *G08G 1/096716* (2013.01); *G08G 1/096741* (2013.01); *G08G 1/096775* (2013.01);
(Continued)

(58) Field of Classification Search
CPC ...... B60W 30/08; B60W 40/04; B60W 40/10; B60W 40/12; G08G 1/163; G08G 1/22; G07C 5/008; H04L 29/08306
USPC .......................................................... 701/31
See application file for complete search history.

(56) References Cited

U.S. PATENT DOCUMENTS 8,717,193 B2 5/2014 Velusamy
9,922,567 B2 * 3/2018 Molin .................. G08G 1/20
(Continued)

FOREIGN PATENT DOCUMENTS

CN 104575102 A 4/2015
KP 10-1096376 12/2011

OTHER PUBLICATIONS

International Searching Authority, International Search Report and Written Opinion, PCT Patent Application PCT/US2018/025552, dated Jul. 27, 2018, 19 pages.

*Primary Examiner* — Yazan A Soofi
(74) *Attorney, Agent, or Firm* — Perkins Coie LLP

(57) ABSTRACT

Systems and methods are described herein for managing communications for a connected vehicle, such as between the connected vehicle and other connected vehicle and/or between the connected vehicle and infrastructure entities, such as providers of services to the connected vehicle. For example, a communication network, such as a network provided by a network carrier, may include various cloud engines or other network-based servers that manage, coordinate, and/or provision communications between the connected vehicle and other parties, such as vehicles, road devices, buildings, and other infrastructure entities.

19 Claims, 11 Drawing Sheets

(51) Int. Cl.
  *B60W 40/04* (2006.01)
  *B60W 40/10* (2012.01)
  *B60W 40/12* (2012.01)
  *B60W 30/08* (2012.01)
  *G08G 1/0967* (2006.01)
  *H04L 29/08* (2006.01)
  *G08G 1/01* (2006.01)
  *G07C 5/08* (2006.01)
  *G08G 1/0962* (2006.01)
  *B60W 50/04* (2006.01)
  *B60W 40/13* (2012.01)
  *B60W 40/08* (2012.01)
  *B60W 50/00* (2006.01)
  *G06Q 30/02* (2012.01)

(52) U.S. Cl.
  CPC ............ *H04L 67/10* (2013.01); *H04L 67/104* (2013.01); *H04L 67/20* (2013.01); *H04L 67/22* (2013.01); *B60W 2040/0863* (2013.01); *B60W 2040/1361* (2013.01); *B60W 2040/1376* (2013.01); *B60W 2040/1384* (2013.01); *B60W 2050/0064* (2013.01); *B60W 2050/0075* (2013.01); *B60W 2050/048* (2013.01); *B60W 2556/45* (2020.02); *B60W 2754/10* (2020.02); *G06Q 30/0241* (2013.01)

(56) References Cited

U.S. PATENT DOCUMENTS

| | | | |
|---|---|---|---|
| 10,548,184 B2 | 1/2020 | Obaidi | |
| 2011/0078024 A1* | 3/2011 | Messier | G06Q 30/02 705/14.63 |
| 2013/0218458 A1* | 8/2013 | Scholl | G08G 1/0962 701/426 |
| 2014/0226010 A1 | 8/2014 | Molin et al. | |
| 2014/0309870 A1* | 10/2014 | Ricci | A61B 5/6808 701/36 |
| 2015/0232065 A1* | 8/2015 | Ricci | A61B 5/6808 701/36 |
| 2016/0292936 A1 | 10/2016 | Palmer et al. | |
| 2017/0050638 A1* | 2/2017 | Gordon | G05D 1/0289 |
| 2017/0084175 A1* | 3/2017 | Sedlik | H04W 4/40 |
| 2017/0168493 A1* | 6/2017 | Miller | G01C 21/3682 |
| 2017/0228709 A1* | 8/2017 | Dhaliwal | G06Q 20/3223 |
| 2017/0276495 A1 | 9/2017 | Krishnan et al. | |
| 2018/0144388 A1* | 5/2018 | Mattern | G06Q 30/0631 |
| 2018/0286244 A1 | 10/2018 | Obaidi | |
| 2018/0286245 A1 | 10/2018 | Obaidi | |

* cited by examiner

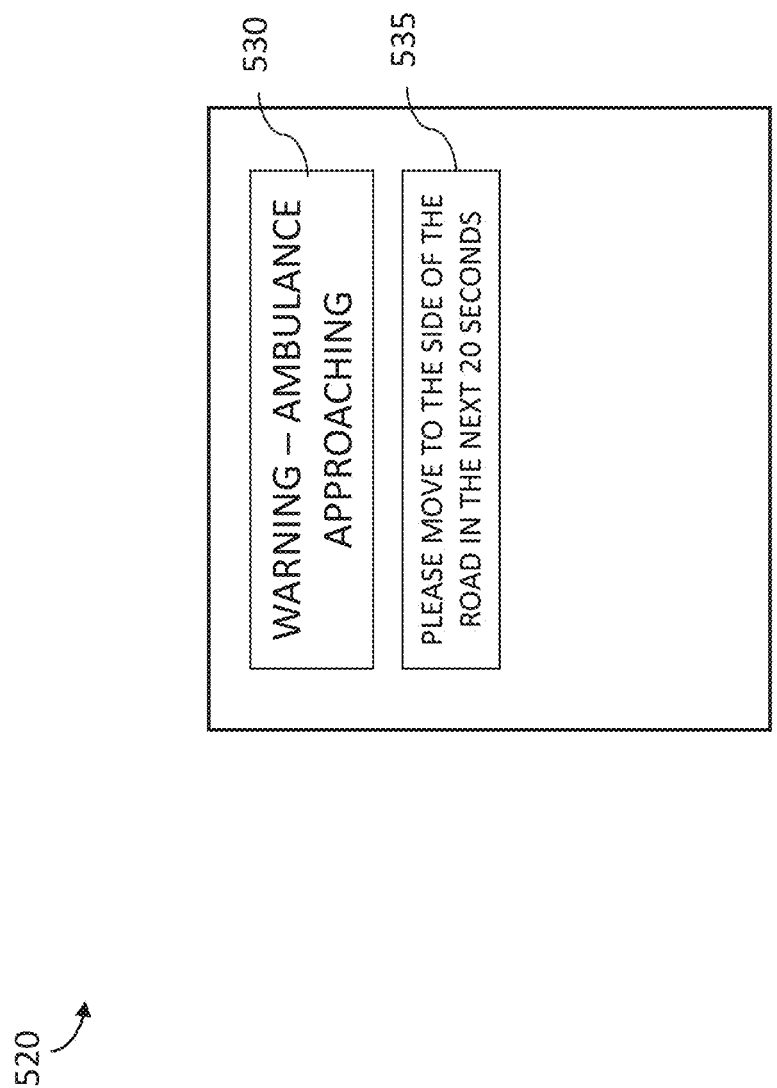

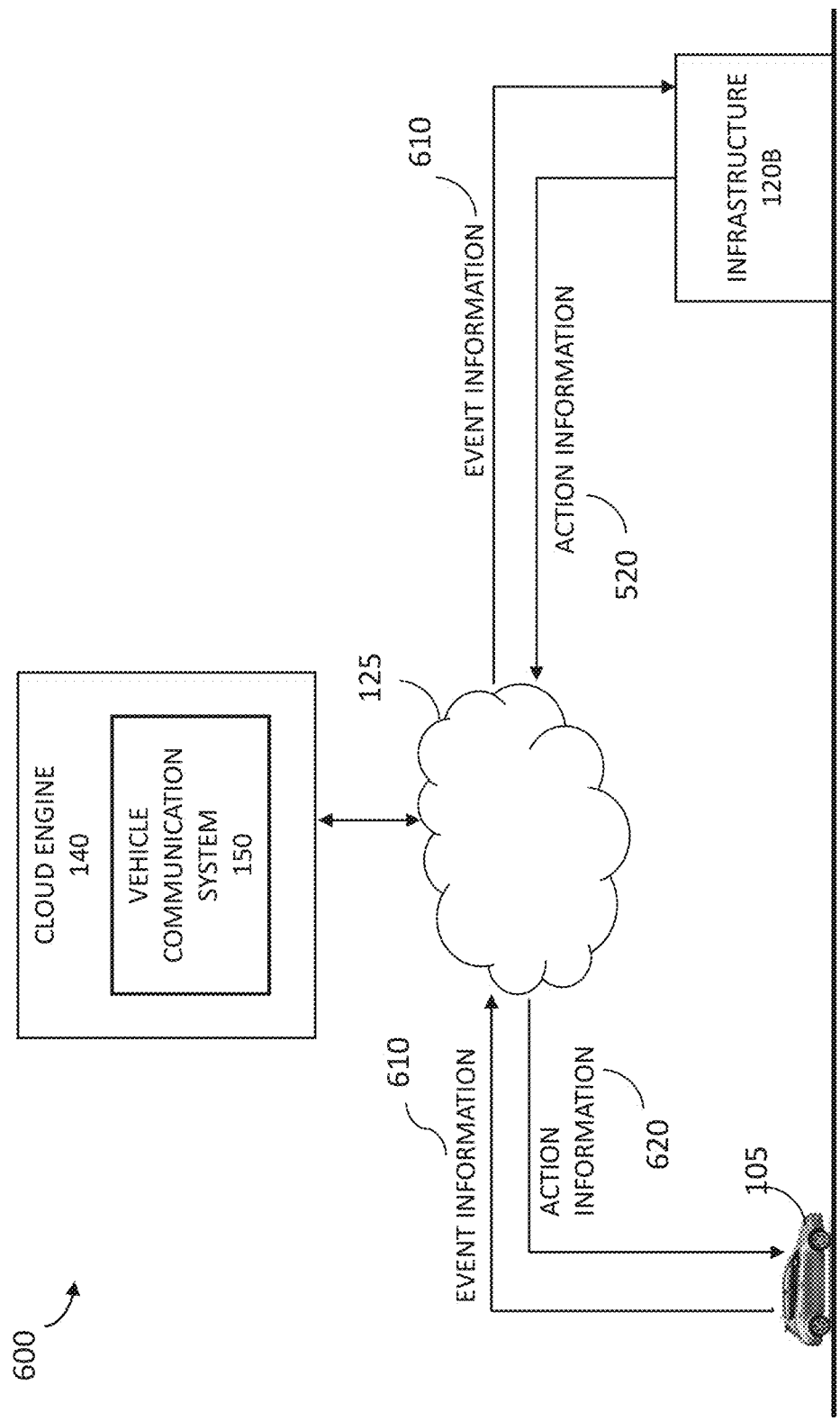

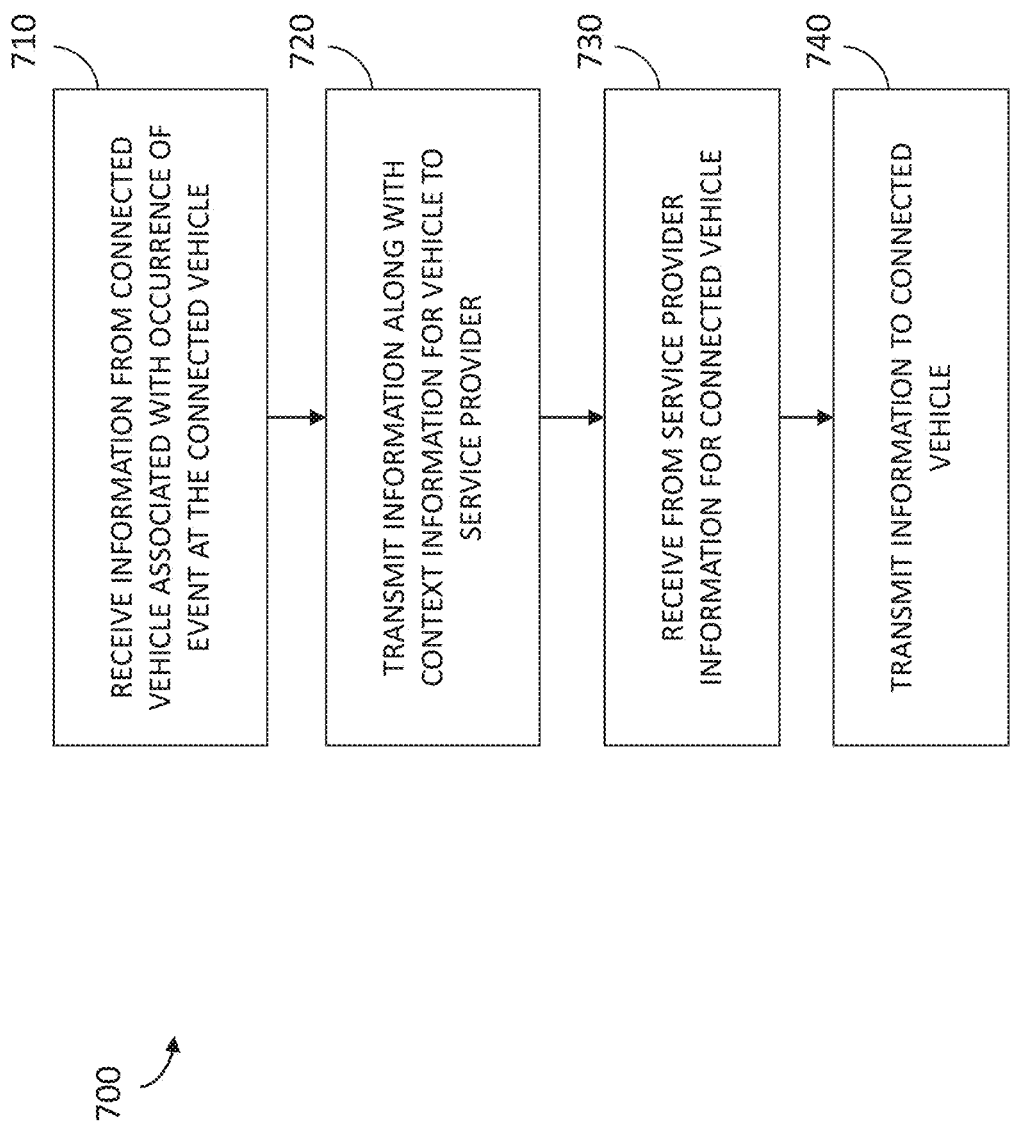

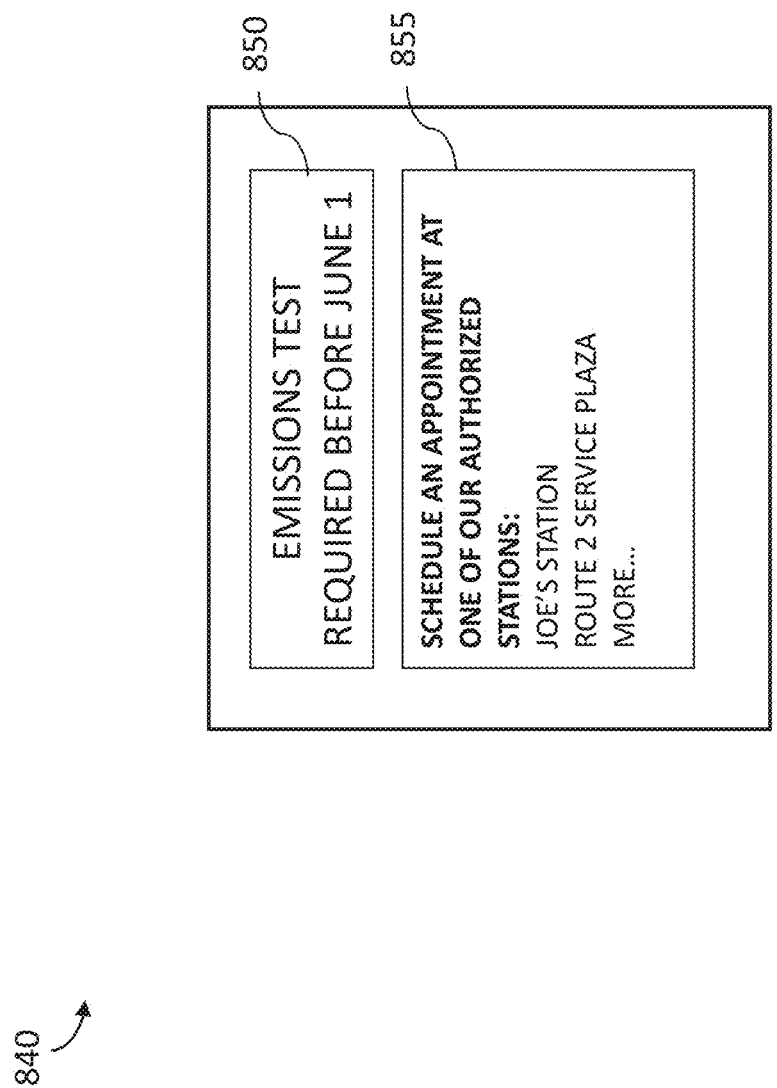

MANAGING COMMUNICATIONS FOR CONNECTED VEHICLES USING A CELLULAR NETWORK

CROSS-REFERENCES TO RELATED APPLICATIONS

This application is a continuation of U.S. patent application Ser. No. 15/476,871, filed on Mar. 31, 2017, and entitled "MANAGING COMMUNICATIONS FOR CONNECTED VEHICLES USING A CELLULAR NETWORK," the disclosure of which is hereby incorporated herein in its entirety by reference. This application is also related to U.S. patent application Ser. No. 15/476,863, filed on Mar. 31, 2017, and entitled "MANAGING COMMUNICATIONS FOR CONNECTED VEHICLES USING A CELLULAR NETWORK," the disclosure of which is hereby incorporated herein in its entirety by reference.

BACKGROUND

The Internet of things (IoT) refers to the interconnection of objects over the Internet, where any object, device, or machine may send data to and/or receive data from any other object, device, or machine, over the Internet. For example, the Internet of things theoretically provides interconnectivity between smart devices, such as smart or connected vehicles, smart buildings, smart homes, smart devices, smart cities, and so on.

At this period in time, however, much of the interconnectivity between objects is not yet realized. For example, there are many different disparate ways to communicate between devices, across different networks, protocols, media, and providers. In other words, the Internet of things may be possible, but has been compromised due to the compartmentalization of its historical implementation.

BRIEF DESCRIPTION OF THE DRAWINGS

Embodiments of the disclosed technology will be described and explained through the use of the accompanying drawings.

FIGS. 5A-5B are display diagrams illustrating information displayed to drivers of connected vehicles.

FIG. 6 is a block diagram illustrating the management of communications between a connected vehicle and one or more infrastructure entities.

FIG. 7 is a flow diagram illustrating a method for communicating information to a connected vehicle.

FIGS. 8A-8C are display diagrams illustrating information displayed to a driver of a connected vehicle.

Figure 1:
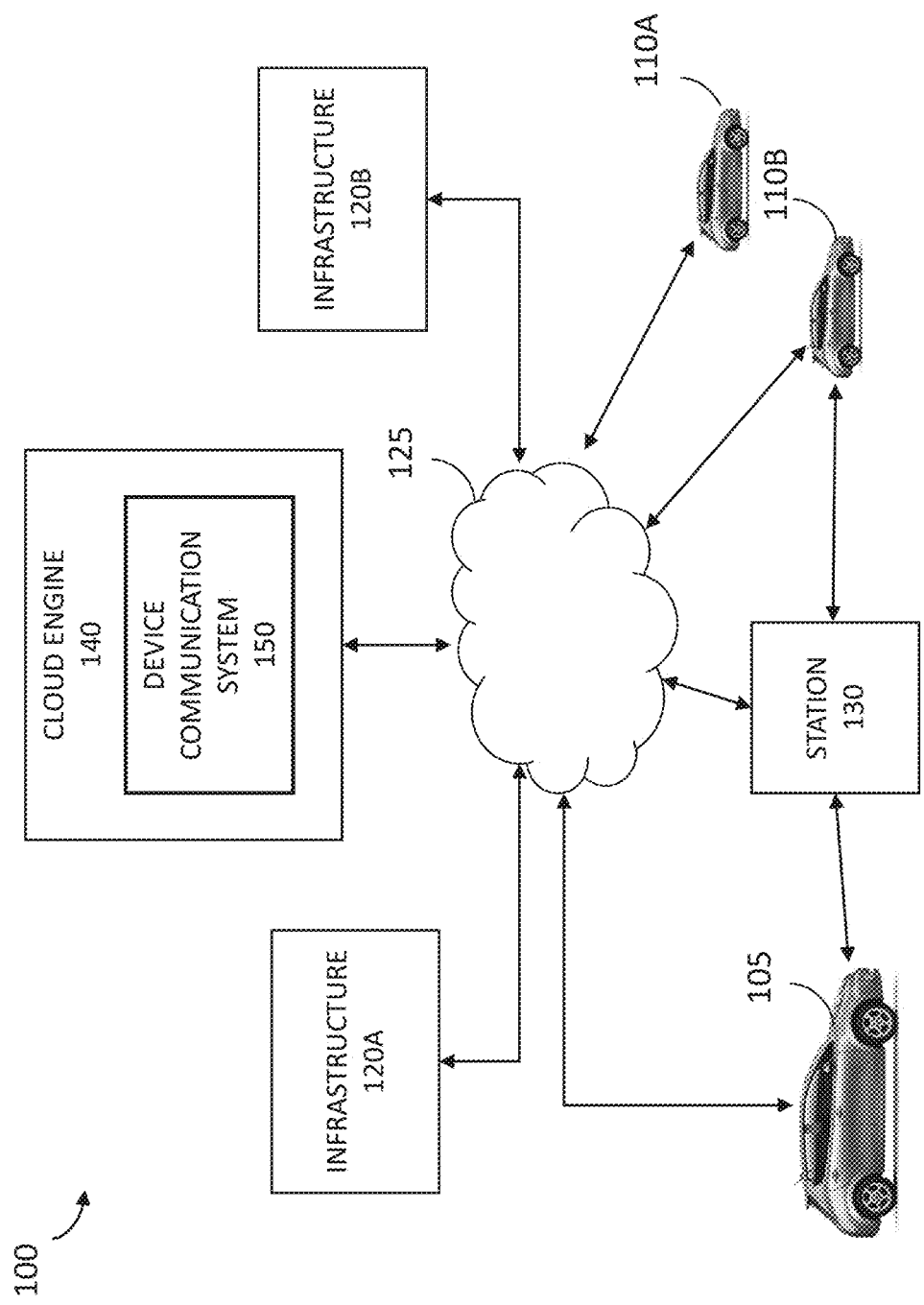
FIG. 1 is a block diagram illustrating a suitable network environment for managing communications for a connected vehicle.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for managing communications for a connected vehicle, such as between the connected vehicle and other connected vehicle and/or between the connected vehicle and infrastructure entities (e.g., providers of services to the connected vehicle). For example, a communication network, such as a network provided by a network carrier, may include various cloud engines or other network-based servers that manage, coordinate, and/or provision communications between the connected vehicle and other parties (e.g., road or traffic devices, buildings, and other infrastructure entities).

Therefore, the systems and methods, in order to facilitate and provide communications for the connected vehicle, utilize various components of the communication network (e.g., user or subscriber databases) to identify appropriate recipients or other communication parties in response to needs of the connected vehicle, such as needs that arise (or, are predicted to arise) based on events or other changing statuses of the connected vehicle. The systems and methods may then facilitate the exchange of information between the connected vehicle and the identified parties (e.g., other vehicles, infrastructure entities, and so on) over the communication network, which manages the connected vehicle and identified parties as communication devices (e.g., user equipment) receiving communication services via the network.

Thus, the systems and methods may enhance the efficacy of the Internet of things by providing a network of inclusivity to various entities, avoiding the problems with compartmentalization by facilitating information exchanges between a connected vehicle and any other connected objects when the connected objects are subscribers of, or otherwise associated with, the network provider, it's communication network, and/or associated access networks, among other benefits.

For example, the systems and methods may manage communications between a connected vehicle and other connected vehicles by receiving information from the vehicle that identifies an occurrence of an event at the vehicle (where the information is not received via a direct vehicle-to-vehicle wireless connection), identifying a subset of the other vehicles located within a geographic area of the connected vehicle and predicted to be affected by the occurrence of the event at the vehicle, and performing an action associated with the identified subset of the other vehicles in response to the occurrence of the event at the vehicle, such as transmitting information indicative of one or more parameters of the occurrence of the event to the identified subset of the other vehicles.

As another example, the systems and methods may provide communications to a connected vehicle by receiving information from the connected vehicle that identifies an occurrence of an event at the connected vehicle, transmitting parameters associated with the occurrence of the event at the vehicle to a third party goods/service provider capable of providing goods or services to a driver of the connected vehicle, receiving information associated with one or more goods or services to be provided to the connected vehicle from the service provider, and sending the information associated with the one or more services to the be provided from the service provider to the connected vehicle, which presents the information to the driver of the connected vehicle.

Various embodiments of the systems and methods will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Network Environments

FIG. 1 is a block diagram illustrating a suitable network environment 100 for managing communications for a connected vehicle. A connected vehicle 105 is configured to communicate with various other connected objects over a network 125, such as other connected vehicles 110A-B and infrastructure objects 120A-B, such as smart buildings, smart homes, road or traffic devices, smart city components and devices, service providers, grid components, and so on.

The communications network 125 is provided by a network carrier, such as a cellular telephone network provider. The network carrier also provides a cloud engine 140, which facilitates the exchanges of information between the connected vehicle 105 and other connected objects, such as the other connected vehicles 110A-B and/or the connected infrastructure 120A-B.

For example, the connected vehicle 105 (and other vehicles 110A-B) may connect to the network 125 via one or more network devices attached or provided to the vehicle 105, such as the T-Mobile® Sync Up Drive™, which connects to an on board diagnostic (OBD) reader, such as via an OBD-II port of the dashboard, or other controller area network (CAN) bus components or devices of the vehicle 105. The attached devices may, for example, collect information and/or diagnose various events, issues, or changing statuses of the vehicle and its components, monitor and track the operation of the vehicle, and so on. The devices, therefore, establish the connected vehicle 105 (and, other vehicles 110A-B) as device on the communications network 125.

Of course, other devices may provide similar information associated with the connected vehicle 105 or other vehicles 110A-B, such as a mobile device associated with drivers of the vehicles (e.g., who may be subscribers of the network), subscriber identity modules (SIM), such as eSIMs (or other dynamically reprogrammable modules), integrated with the vehicles, and/or other communication components that are part of the vehicles and/or devices within the vehicles and configured to communicate over the communications network 125.

In addition to the devices directly or indirectly coupled to the connected vehicle 105, other devices or objects may facilitate providing communications to the connected vehicle via the communications network 125. For example, pole stations and other smart road or smart city devices (e.g., such as 5G micro base stations placed in buildings, on utility poles, and so on) may be connected to the network 125, and facilitate exchanges of information between the connected vehicle 105 and the network 125. Similarly, one or more networked devices may communicate with the vehicle 105 when the parked at home, in a parking garage, or in a parking space. Therefore, in some cases (such as when the driver is not a subscriber of the network 125), the vehicle 105 may encounter and exchange information with various networked devices when traveling, and the devices provide the access to the communications network 125.

The connected infrastructure 120A-B objects may also include or interact with various components or devices configured to provide access to the communications network 125. For example, the infrastructure objects 120A-B may include servers or other computing devices that access the network 125 via eSIM components, wireless routers or other access points, and so on.

Therefore, the network carrier provides an end-to-end communication path between the connected vehicle 105 and various other parties via the communications network 125 provided by and/or managed by the network carrier.

In order to facilitate real-time, efficient, appropriate, and/or intended communications between the connected vehicle 105 and other parties, the network carrier, via the cloud engine 140, provides a device communication system 150, which includes components that perform various operations for identifying parties to connected to the connected vehicle and facilitating exchanges of information between the connected vehicle and the identified parties, among other operations. For example and as described herein, the device communication system 150 may facilitate vehicle to vehicle (V2V) communications, vehicle to infrastructure (V2I) communications, and/or vehicle to any object (V2X) communications. Further details regarding the components of the device communication system 150 are described in greater detail here.

FIG. 1 and the discussion herein provide a brief, general description of the components of the network environment 100. Although not required, aspects of the network environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

As described herein some embodiments, the connected vehicle 105 may include network communication components that enable the devices to communicate with remote servers or other portable electronic devices by transmitting and receiving wireless signals using a licensed, semi-licensed, or unlicensed spectrum over communications network, such as the network 125. In some cases, the communication network 125 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Those skilled in the art will appreciate that various other components may be included in the connected vehicle 105 to enable network communication. For example, the connected vehicle 105 may be configured to communicate over a GSM or newer mobile telecommunications network. As a result, the connected vehicle 105, which may be an attached device, removably attached device, or device integrated with the vehicle, may include a Subscriber Identity Module (SIM) card, or eSIM, that stores an International Mobile Subscriber Identity (IMSI) number that is used to identify the connected vehicle 105 on the GSM mobile or other communications networks, for example, those employing LTE, 3G and/or 4G wireless protocols. If the connected vehicle 105 is configured to communicate over another communications network, the connected vehicle 105 may include other components that enable it to be identified on the other communications networks.

In some embodiments, the connected vehicle 105 may include components that enable it to connect to a communications network using Generic Access Network (GAN), Unlicensed Mobile Access (UMA), or LTE-U standards and protocols. For example, the connected vehicle 105 may include components that support Internet Protocol (IP)-based communication over a Wireless Local Area Network (WLAN) and components that enable communication with the telecommunications network over the IP-based WLAN. Further, while not shown, the connected vehicle 105 may include capabilities for permitting communications with satellites. The mobile device 110 may include one or more mobile applications that transfer data or check-in with remote servers and other networked components and devices.

The communications network 125 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), Long Term Evolution (LTE) network), Voice over LTE (VoLTE) network, or other communications network. Further, the communications network 120 may include or be part of a wireless communications network, such as an Internet Multimedia System (IMS) network or other wireless networks.

Examples of Manacling Communications for a Connected Vehicle

Figure 2:
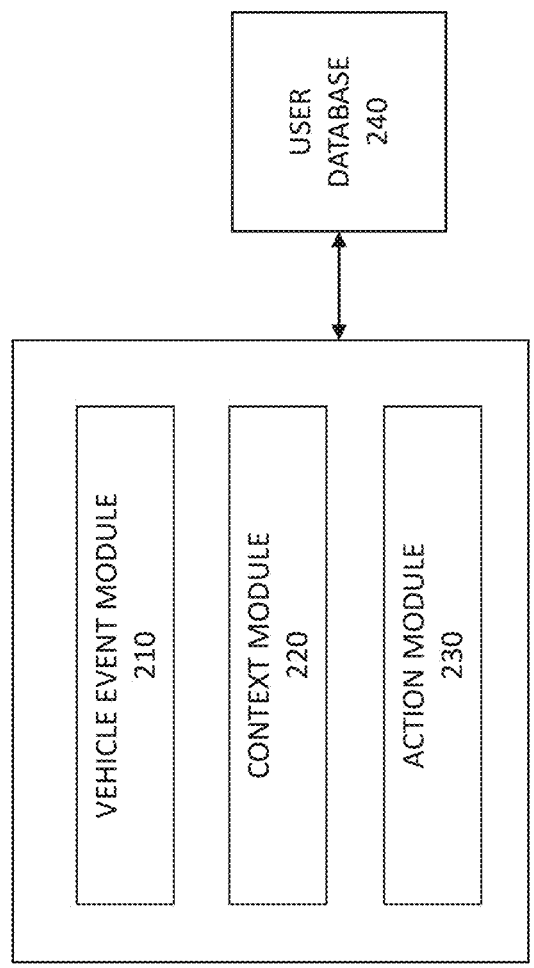
FIG. 2 is a block diagram illustrating the components of a network-based device communication system.

As described herein, in some embodiments, the systems and methods facilitate the exchange of communications between the connected vehicle 105 and various associated network objects, such as other vehicles 110A-B and/or infrastructure 120A-B. FIG. 2 is a block diagram illustrating the components of the device communication system 150. The system 150 may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein. For example, the system 150 may include a vehicle event module 210, a context module 220, and an action module 230.

In some embodiments, the vehicle event module 210 is configured and/or programmed to receive or otherwise access information from the communication device of the connected vehicle 105 that identifies an occurrence of an event at the vehicle, such as an abnormal or unexpected event at the vehicle 105. The communication device may monitor status information via the OBS reader of the vehicle 105, and collect and/or provide various information that identifies normal or abnormal operations of the vehicle 105 and its components.

For example, an occurrence of an event at the may include a change in status of the vehicle 105 and/or of one of the components of the vehicle 105. Example events that may occur include:

vehicle breakdown events, such as an overheating of an engine, a change in pressure of one or more of the tires of the vehicle 105, fuel or battery level below a certain minimum threshold, other engine or transmission troubles, and so on;

abnormal operation events, such as a sudden acceleration or deceleration of the vehicle 105, a speed of travel outside a normal range of speed, such as in comparison to speed limits for a route traveled by the vehicle 105, a lack of movement of the vehicle 105 over a certain period of time, operation of hazard lights and/or dashboard indicators, and so on;

emergency operation events, such as the initiation of an emergency status for an emergency vehicle (e.g., police car, fire truck, ambulance, and so on), operation of construction or other repair vehicles, and so on;

congestion or traffic events, such as the idling or double parking of a delivery vehicle (along with hazard lights), initiation of windshield wipers or other weather related sensors (in combination with a change of speed), and so on;

and other events, over certain time periods, that may indicate a current or predicted change in operation of the connected vehicle 105, which may cause or affect the current or future operation of the other vehicles 110A-B, and/or may indicate a request or desire for certain services to be provided by service providers associated with the infrastructure entities 120A-B In some embodiments, the context module 220 identifies other vehicles 110A-B and/or infrastructure entities 120A-B to exchange communications in response to the event at the connected vehicle 105. For example, the context module 220 may determine, based on parameters and/or characteristics of the event and/or various context information associated with the event, whether to identify other vehicles 110A-B and/or other entities 120A-B to receive and/or exchange communications about the occurrence of the event at the connected vehicle 105.

In some cases, the context module 220 identifies a subset of other vehicles, located within a geographic area that includes the vehicle, which are predicted to be affected by the occurrence of the abnormal event at the vehicle. For example, the context module 220 may identify, from a subscriber database 240 of the network carrier that is associated with a cloud-based network server (e.g., cloud engine 140), one or more subscribers, such as wireless subscribers, of the communications network that are currently within vehicles located with a geographic area that includes the connected vehicle 105, on a route traveled by (or, predicted to be traveled by) the connected vehicle 105, and/or at areas predicted to be affected by the event that occurred at the connected vehicle 105.

In other cases, the context module 220 transmits parameters associated with the occurrence of the event at the connected vehicle 105 from the cloud-based network server to a service provider capable of providing services to a driver of the connected vehicle (e.g., a service provider associated with one of the entities 120A-B). For example, the context module 220 may send parameters or other information that identifies the occurrence of the event at the connected vehicle 105 and information identifying a context for the occurrence of the event at the vehicle 105.

In some embodiments, the action module 230 is configured and/or programmed to perform an action associated with the connected vehicle 105 to provide information to the other vehicles 110A-B and/or provide information from service providers to the connected vehicle 105.

For example, in some cases, the action module 230 may perform actions during V2V communications, such as providing information to be displayed to drivers of an identified subset of the other vehicles 110A-B in response to the occurrence of an abnormal or other event at the connected vehicle 105.

As another example, in some cases, the action module 230 may receive, from a service provider associated with one of the infrastructure entities 120A-B, information associated with one or more services to be provided to the connected vehicle 105 from the service provider, and send the information associated with the one or more services to be provided from the service provider to the connected vehicle, which may present (via a display) the information to the driver of the connected vehicle 105.

Therefore, in some embodiments, the device communication system 150 utilizes subscriber data, such as user or subscriber data stored in the user/subscriber database 240, to identify and/or select recipients or other parties via which to connect to the connected vehicle 105 during occurrences of various events at the connected vehicle 105, among other benefits. As described herein, the system 150 may facilitate V2V communications, V2I communications, and/or V2X communications via the communications network 125. The next sections expand on various use cases or scenarios supported and/or facilitated by such network-based communication systems.

Examples of Vehicle to Vehicle (V2V) Communications

Figure 3:
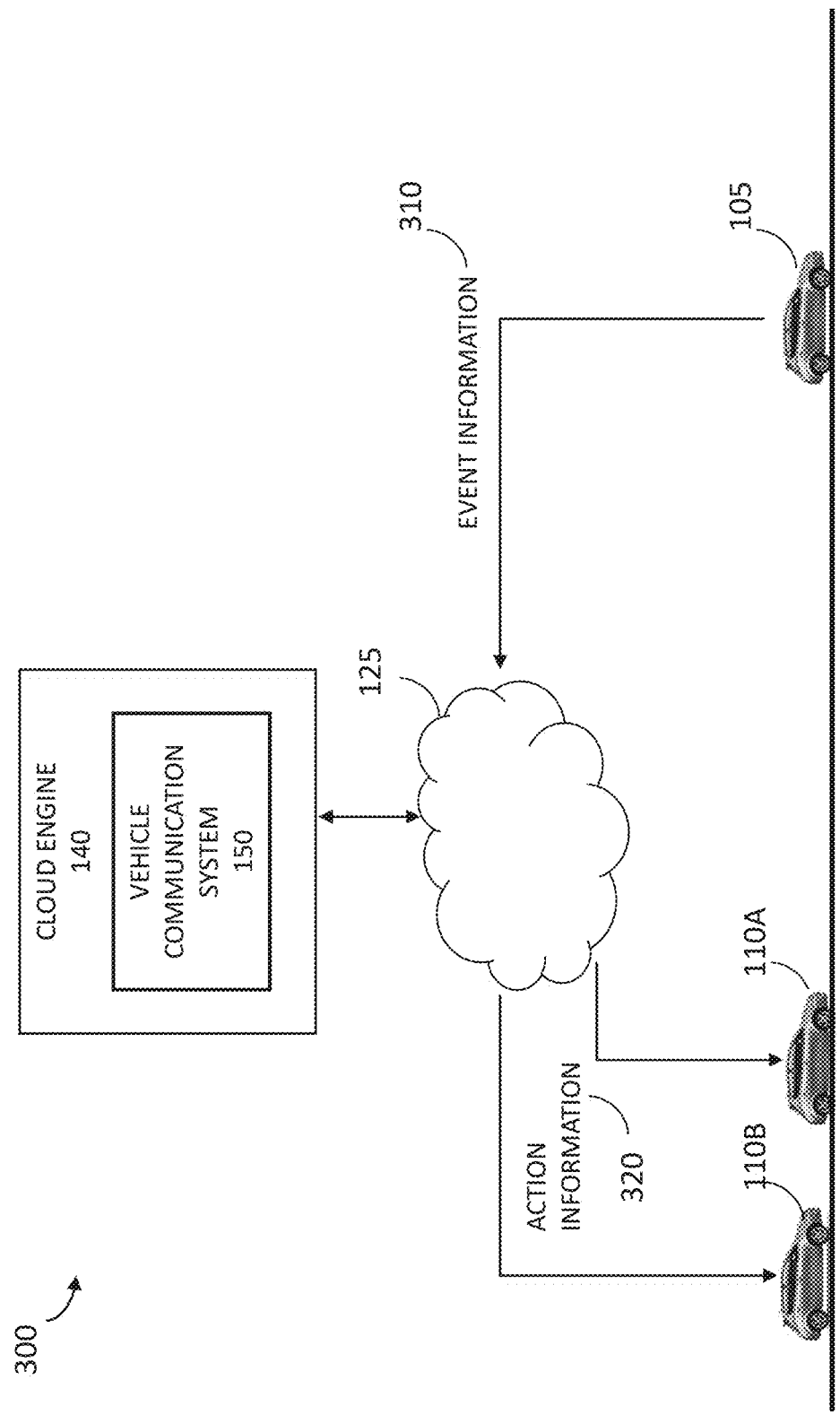
FIG. 3 is a block diagram illustrating the management of communications between connected vehicles.

FIG. 3 is a block diagram 300 illustrating the management of communications between connected vehicles. An event occurs at the connected vehicle 105, which is traveling along a route of travel and/or in a geographical area that also includes vehicles 110A and 110B. In response to the event, the connected vehicle 105 sends event information, such as information identifying the event, the location of the event, and/or other parameters, to the vehicle communication system 150 hosted by the cloud engine 140. In or near real-time, the system 150 performs an action based on the event, and provides action information 320 to the other vehicles 110A and 110B, such as information that alerts them to the event, the location of the event, possible effects of the event to traffic and/or their route of travel, and so on.

Figure 4:
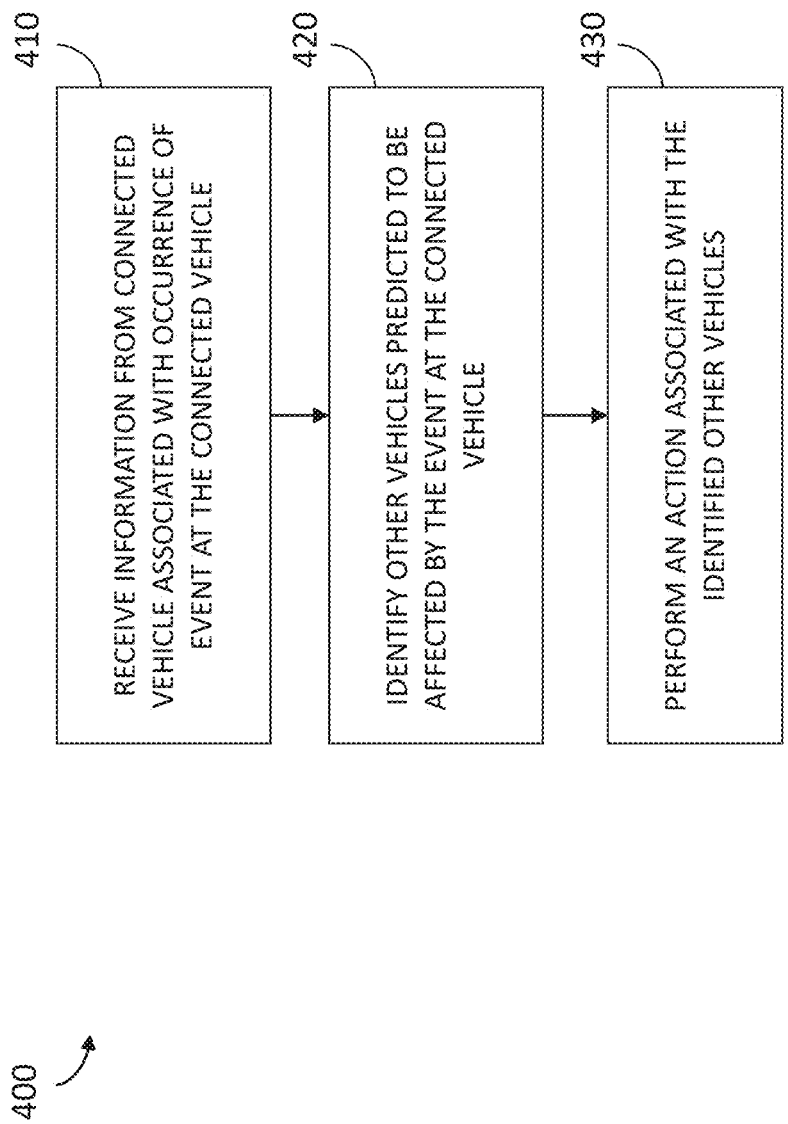
FIG. 4 is a flow diagram illustrating a method for communicating information between connected vehicles.

As described herein, the system 150 performs various operations for identifying and providing information and/or performing actions for connected vehicles in response to events at other connected vehicles within the communications network 125. FIG. 4 is a flow diagram illustrating a method 400 for communicating information between connected vehicles. The method 400 may be performed by the system 150 and, accordingly, is described herein merely by way of reference thereto. It will be appreciated that the method 400 may be performed on any suitable hardware.

In operation 410, the system 150 receives information from the connected vehicle 150 that identifies an occurrence of an event at the vehicle 150. For example, the vehicle event module 210 may receive or otherwise access information from the communication device of the connected vehicle 105 that identifies an occurrence of an event at the vehicle, such as an abnormal or unexpected event at the vehicle 105. The communication device may monitor status information via the OBS reader of the vehicle 105, and collect and/or provide various information that identifies normal or abnormal operations of the vehicle 105 and its components.

In operation 420, the system 150 identifies a subset of the other vehicles located within a geographic area that includes the connected vehicle 105 that are predicted to be affected by the occurrence of the event at the vehicle 105. For example, the context module 220 may identify, from the subscriber database 240 of the network carrier that is associated with a cloud-based network server (e.g., cloud engine 140), one or more subscribers of the communications network that are currently within vehicles located with a geographic area that includes the connected vehicle 105, on a route traveled by (or, predicted to be traveled by) the connected vehicle 105, and/or at areas predicted to be affected by the event that occurred at the connected vehicle 105.

As described herein, the system 150, in some cases, determines, from the information that identifies the occurrence of the event at the vehicle, a location of the vehicle 105 and a current status of the vehicle 105, and selects the subset of other vehicles based on the determined location of the vehicle 105.

In operation 430, the system 150 performs an action associated with the identified subset of the other vehicles in response to the occurrence of the event at the vehicle 105, such as an action of transmitting information indicative of one or more parameters of the occurrence of the event to the identified subset of the other vehicles 110A-B. For example, the system 150 may perform an action based on the determined status of the vehicle 105.

In some cases, the system 150 may also communicate with non-vehicle devices in order to mitigate issues that may arise during the event at the vehicle 105. For example, in addition to performing actions associated with the other vehicles 110A and 110B, the system 150 may perform an additional action associated one or more traffic devices within the geographical area that modifies operation of the one or more traffic devices based on the occurrence of the event at the vehicle.

Figure 5A:
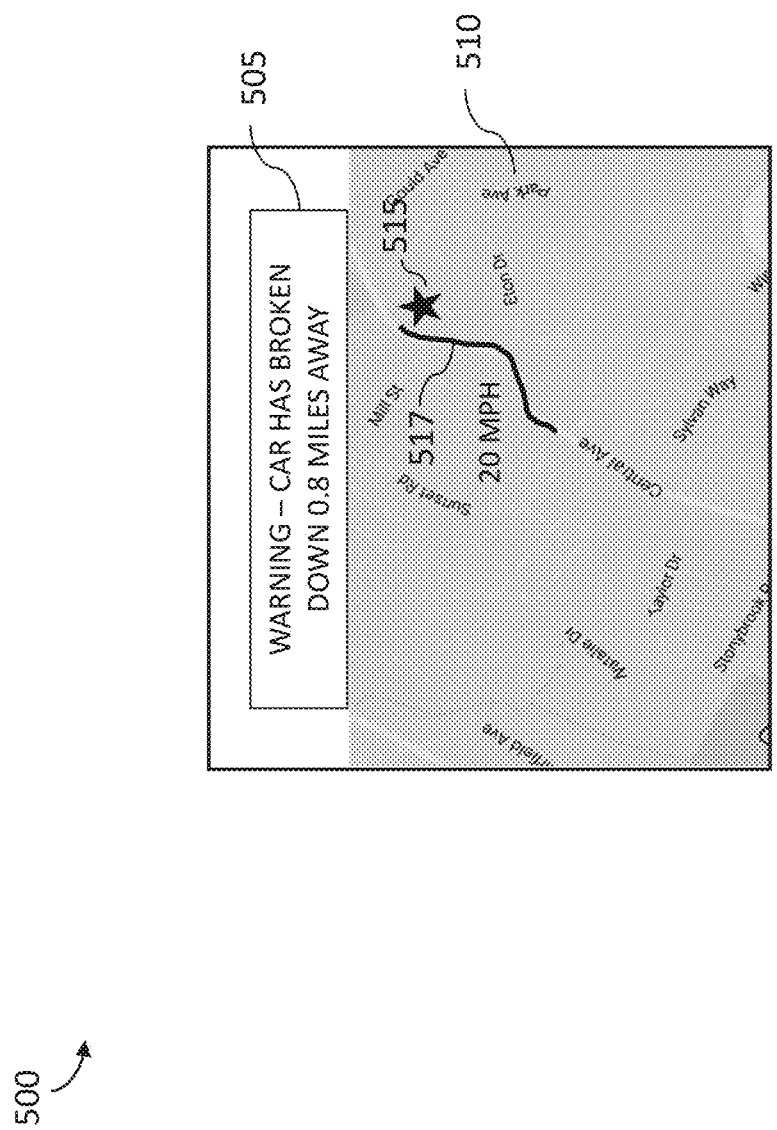

Thus, the system 150 may perform actions in a variety of scenarios. FIG. 5A depicts a display 500 of information presented to drivers of the connected vehicles 110A and 110B during an occurrence of an event at the connected vehicle 105. For example, an event occurs at the connected vehicle 105, such as an abnormal operation of the vehicle for a certain period of time, an abnormal operation of one or more components of the vehicle for a certain period of time, that vehicle is traveling in an abnormal manner within the geographic area, and so on.

The system 150, upon receiving the information 310 from the vehicle 105, identifies other vehicles 110A and 110B traveling within the area of the vehicle 105, such as the scenario depicted in FIG. 3 where the vehicles 110A and 110B are depicted as traveling behind the vehicle 105 along the same route. The system 150 performs an action to provide information to those vehicles 110A and 110B. As shown in FIG. 5A, the system 105 causes the display of the vehicle 110A to present information 505 about the event at the vehicle (e.g., "car has broken down 0.8 miles away), as well as indicators within a GPS interface 510 of the vehicle 110A, such as an indicator 515 of the location of the vehicle 515 and information 517 identifying the new traffic patterns arising from the event at the vehicle 105.

FIG. 5B depicts another display 530 of information presented to drivers of the connected vehicles 110A and 110B during an occurrence of an event at the connected vehicle 105. In this example, the connected vehicle is an ambulance, and an event occurs when the ambulance modifies its status into emergency mode. Therefore, the connected vehicle 105 provides event information 310 to the system 150 that indicates a destination to which the ambulance is traveling, and that the ambulance is traveling in an emergency mode of travel to the destination.

The system 150, using the event information 310, identifies other vehicles along the expected route of travel for the ambulance, and causes the displays of the vehicles to present information 530 about the event (e.g., "ambulance approaching"), as well as instructions 535 associated with when the ambulance is expected to encounter the vehicles. Further, the system 150 may cause traffic lights or other traffic devices to modify operations to facilitate a clear path of travel for the ambulance.

Therefore, the system 150 may provide vehicles with various information when performing actions in response to events at the connected vehicles, such as information that indicates a change in traffic conditions for other vehicles based on the occurrence of the event at the vehicle 105, information that causes displays within vehicles to present information that depicts a change in traffic conditions based on the occurrence of the event at the vehicle 105, information that causes displays within vehicles to present information that identifies a location of the vehicle and information that represents the occurrence of the event at the vehicle, and so on.

In performing the actions for the other vehicles 110A and 1106, the system 150 may modify traffic flows, prevent or mitigate potential accidents, provide clear paths for emergency vehicles, provide drivers with real-time information about traffic conditions or modifications, and so on.

For example, the system 150 may perform a method of providing updated traffic information to vehicles traveling on a common route to a destination, by receiving, a signal from a certain vehicle traveling on the common route to the destination that an abnormal event has occurred at the certain vehicle, identifying other vehicles traveling on the common route, selecting at least one vehicle of the identified other vehicles traveling on the common route predicted to be affected by the abnormal event at the certain vehicle, and sending to the selected at least one vehicle, information that identifies a location of the certain vehicle and a status of the certain vehicle based on the abnormal event at the certain vehicle.

Examples of Vehicle to Infrastructure (V2I and V2X) Communications

FIG. 6 is a block diagram 600 illustrating the management of communications between a connected vehicle and one or more infrastructure entities. As depicted, an event occurs at the connected vehicle 105. The connected vehicle 105 sends event information 610 to the vehicle communication system 150 supported by the cloud engine 140. The system 150, as described herein, identifies one or more goods or service providers such as those associated with infrastructure object 120B, capable of providing services to the connected vehicle 105 in response to the event, and transmits the event information (along with context information) 610 to the infrastructure object 120B.

The goods/service provider selects one or more goods or services to provide to the connected vehicle 105, and transmits action information 620 to the connected vehicle 105 via the system 150 (e.g., via the communications network 125 provided by the network carrier that supports the cloud engine 140).

As described herein, the system 150 performs various operations for providing information, such as services and other actionable items, to the connected vehicle 105. FIG. 7 is a flow diagram illustrating a method 700 for communicating information to the connected vehicle 700. The method 700 may be performed by the system 150 and, accordingly, is described herein merely by way of reference thereto. It will be appreciated that the method 700 may be performed on any suitable hardware.

In operation 710, the system 150 receives information from the connected vehicle that identifies an occurrence of an event at the connected vehicle. For example, the vehicle event module 210 may receive or otherwise access information from the communication device of the connected vehicle 105 that identifies an occurrence of an event at the vehicle, such as an abnormal or unexpected event at the vehicle 105.

In operation 720, the system 150 transmits parameters associated with the occurrence of the event at the vehicle to a service provider capable of providing services to a driver of the connected vehicle 105. For example, the context module 220 may send event parameters or other event information 610 that identifies the occurrence of the event at the connected vehicle 105 and information identifying a context for the occurrence of the event (as described herein) at the vehicle 105.

The transmitted information 610 may include information associated with the occurrence of the event at the vehicle and information identifying a context for the occurrence of the event at the vehicle, such as a current location of the vehicle, a status of the vehicle and/or its components, and so on.

In some examples, the context module 220 may select the service providers in a variety of ways. For example, the context module 220 may transmit parameters associated with the occurrence of the event at the vehicle to one or more service providers that are located within a geographical area that includes the connected vehicle, to one or more service providers that are located within a geographical area that is predicted to be a current travel destination of the connected vehicle, to one or more service providers that are located along a route currently traveled by the connected vehicle, and so on.

Further, the context module 220 may identify and transmit information 610 to multiple different service providers, such as a first service provider capable of providing a service to the driver of the connected vehicle associated with the event at the connected vehicle (e.g., a car repair shop), and a second service provider capable of providing a service to the driver that is unconnected to the event at the connected vehicle (e.g., a restaurant close to the repair shop).

In operation 730, the system 150 receives, from the service provider, information associated with one or more services to be provided to the connected vehicle from the service provider, and, in operation 740, sends the information associated with the one or more services to the be provided from the service provider to the connected vehicle 105, which presents the information to the driver of the connected vehicle (via a display of the vehicle, a mobile device associated with the driver, and so on).

Figure 8A:
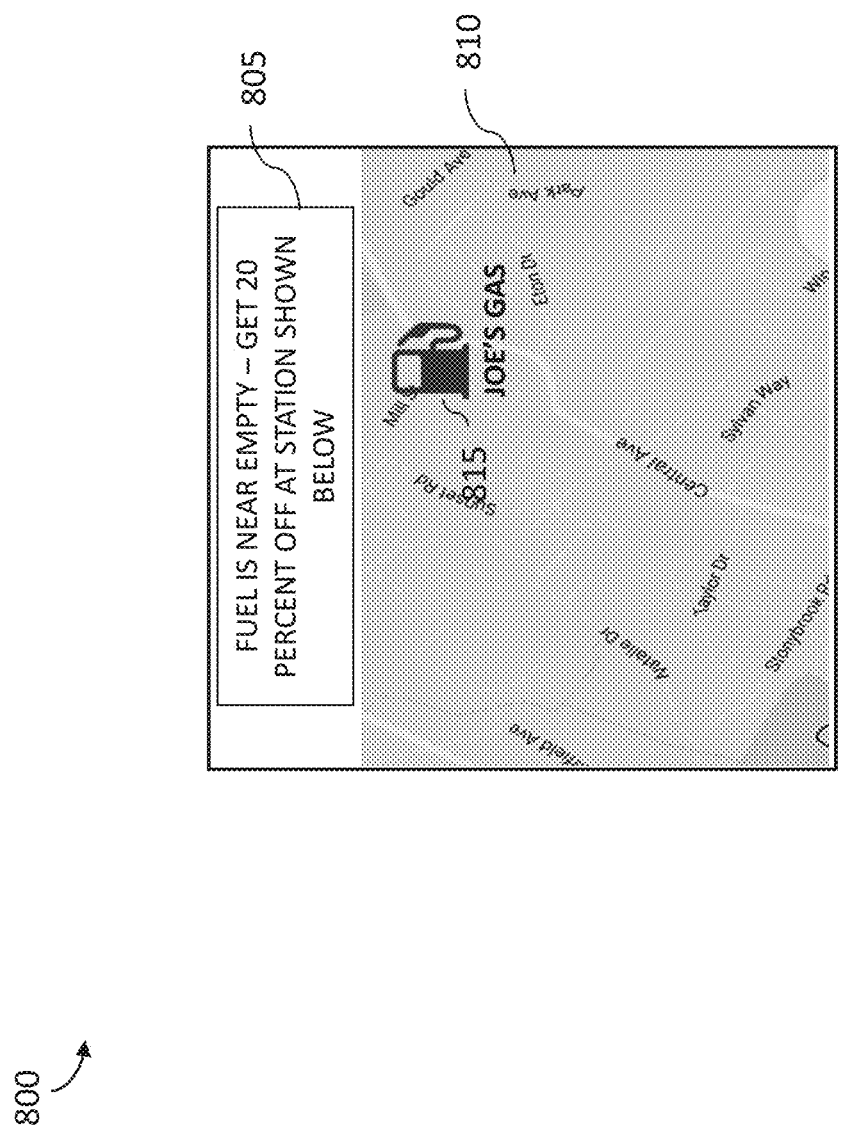

As described earlier, the system 150 may perform actions in a variety of scenarios. FIG. 8A depicts a display of information presented by the system 150 to a driver of the connected vehicle 105. For example, an event occurs at the connected vehicle 105, where the gas or battery charge level of the vehicle falls below a threshold (e.g., the fuel or battery charge level is below 10 percent).

The system 150 as described herein facilitates the exchange of the event information 610 (e.g., gas level low) and context information (e.g., Lat-Lon coordinates for the location of the vehicle 105) to various service providers associated with connected infrastructure 120B (e.g., gas stations within proximity to the vehicle 105). One of the service providers transmits, via the system 150, action information 620, which is displayed to the driver of the connected vehicle 105. For example, as shown in FIG. 8A, the vehicle display 800 presents an incentive or discount 805 to travel to a certain gas station or electric vehicle charging station, along with location information 815 that identifies the gas station providing the discounted gas within a displayed GPS map 810.

Figure 8B:
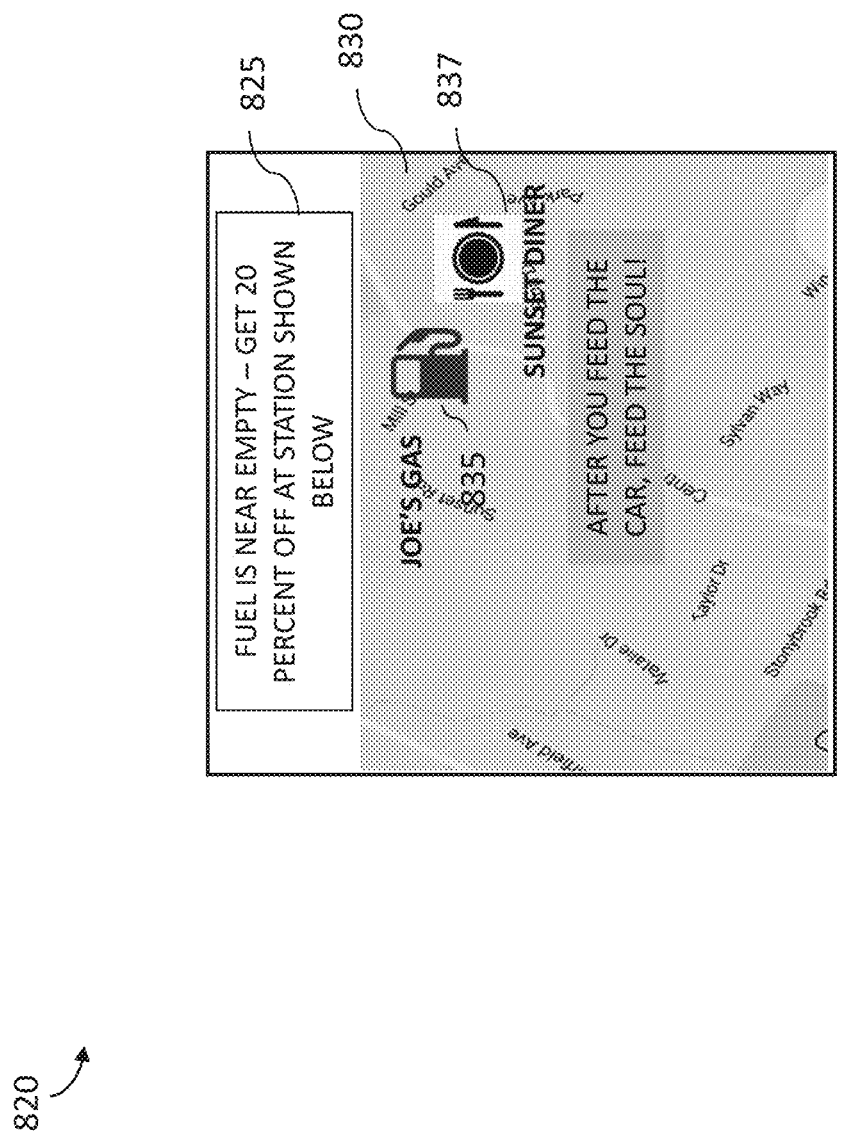

Following the example depicted in FIG. 8A, the system 150 may provide information from multiple providers. As shown in the display 820 of FIG. 8B, the system 150 may perform actions within the display of the vehicle 105 that present the coupon to buy gas 825, the location of the gas station 835 within the displayed map 830, and another advertisement 837 that non-vehicle related information, such as a diner that is proximate to the gas station 835.

In some cases, the system 150 may facilitate other communication exchanges. For example, as depicted in FIG. 8C, an event occurs at the vehicle 105 where the vehicle emissions metric fall below a minimum threshold. The vehicle 105 may automatically provide the information to the system 105, which identifies various repair shops capable of performing emissions testing and/or repairs for the vehicle. The shops, via the system 150, may send information to be displayed by the vehicle, such as information 850 that identifies the testing, and information 855 identifying various facilitates capable of performing the test. In some cases, the system may select one of the presented choices, and schedule the test via the system 150.

Thus, in some embodiments, the system 150 may facilitate V2I and/or V2X communications and/or provide services to a connected vehicle, by receiving information from the connected vehicle that indicates a current operational status of the connected vehicle, identifying one or more service providers capable of providing services to the connected vehicle based on the current operational status of the connected vehicle and causing the identified one or more service providers to transmit information that identifies the services provided by the one or more service providers.

Examples of Additional Communication Scenarios for a Connected Vehicle

As described herein, the device communication system 150, as supported by the cloud engine 140 within the communication network 125, facilitates exchanges of information between vehicles, infrastructure, and/or other connected objects or devices within the communication network 125. The following are examples of additional scenarios:

A driver or her passengers may provide information request information about places to eat, and the system 150 facilitates the exchange of information between the connected vehicle 105 and various dining establishments along the vehicle's route of travel, such as the presentation of coupons and other information to the occupants of the vehicle, 105;

A vehicle may pay for tolls, ferries, bridges, parking, parking or other traffic violations via some or all aspects of the system 150;

Various capture devices of the vehicle 105, such as cameras, sensors, and so on, may capture weather and other environmental information surrounding the vehicle 105, which, via the system 150, is provided to other vehicles along the route of travel of the vehicle 105; and so on.

Example Embodiments of the Disclosed Systems and Methods

A method for managing communications between a vehicle and other vehicles associated with the vehicle, the method comprising receiving information from the vehicle that identifies an occurrence of an event at the vehicle, wherein the information is received by a cloud-based network server associated with a network carrier providing a communications network to the vehicle and other vehicles located within a geographical area, and wherein the information is not received via a direct vehicle-to-vehicle wireless connection; identifying, at the cloud-based network server, a subset of the other vehicles located within the geographic area predicted to be affected by the occurrence of the event at the vehicle; and performing, at the cloud-based network server, an action associated with the identified subset of the other vehicles in response to the occurrence of the event at the vehicle, wherein the performed action includes transmitting information indicative of one or more parameters of the occurrence of the event to the identified subset of the other vehicles.

A system that communicates with a connected vehicle, wherein the connected vehicle includes a communication device configured to facilitate exchanges of information between the connected vehicle and a cloud-based network server associated with a network carrier that contains the system and provides a communications network to the vehicle, the system comprising: a vehicle event module that receives information from the communication device of the vehicle, wherein the vehicle event module identifies an occurrence of an abnormal event at the vehicle based on the information received from the communication device; a context module that identifies a subset of other vehicles, located within a geographic area that includes the vehicle, which are predicted to be affected by the occurrence of the abnormal event at the vehicle; and an action module that performs an action associated with the identified subset of the other vehicles in response to the occurrence of the abnormal event at the vehicle.

A non-transitory computer-readable medium whose contents, when executed by a network server, cause the network server to perform a method of providing updated traffic information to vehicles traveling on a common route to a destination, the method comprising: receiving, at the network server, a signal from a certain vehicle traveling on the common route to the destination that an abnormal event has occurred at the certain vehicle; identifying other vehicles traveling on the common route; and selecting at least one vehicle of the identified other vehicles traveling on the common route predicted to be affected by the abnormal event at the certain vehicle; and sending to the selected at least one vehicle, information that identifies a location of the certain vehicle and a status of the certain vehicle based on the abnormal event at the certain vehicle.

A method for performing actions for a wirelessly connected vehicle, the method comprising: receiving information from the connected vehicle that identifies an occurrence of an event at the connected vehicle, wherein the information is received by a cloud-based network server associated with a network carrier providing a cellular telephone communications network to the connected vehicle; transmitting parameters associated with the occurrence of the event at the vehicle from the cloud-based network server to a service provider capable of providing services to a driver of the connected vehicle, wherein the transmitted parameters include information associated with the occurrence of the event at the vehicle and information identifying a context for the occurrence of the event at the connected vehicle; receiving, from the service provider, information associated with one or more services to be provided to the connected vehicle from the service provider; and sending the information associated with the one or more services to be provided from the service provider to the connected vehicle, which presents the information to the driver of the connected vehicle.

A system at a cloud-based server associated with a network carrier providing a communications network to a connected vehicle, the system comprising: a vehicle event module that receives information from the connected vehicle that identifies an occurrence of an event at the connected vehicle; a context module that transmits parameters associated with the occurrence of the event at the vehicle from the cloud-based network server to a service provider capable of providing services to a driver of the connected vehicle, wherein the transmitted parameters include information associated with the occurrence of the event at the connected vehicle and information identifying a context for the occurrence of the event at the connected vehicle; and an action module that: receives, from the service provider, information associated with one or more services to be provided to the connected vehicle from the service provider; and sends the information associated with the one or more services to be provided from the service provider to the connected vehicle, so that the information is to be presented to the driver of the connected vehicle.

A non-transitory computer-readable medium whose contents, when executed by a cloud-based network server, cause the cloud-based network server to perform a method of providing services to a connected vehicle, the method comprising: receiving information from the connected vehicle that indicates a current operational status of the connected vehicle, wherein the information is transmitted over a communications network managed by a network carrier that also manages the cloud-based network server; identifying, at the cloud-based network server, one or more third party goods/service providers capable of providing good or services to the connected vehicle based on the current operational status of the connected vehicle; and causing information related to the identified one or more third party goods/service providers to be transmitted, over the communications network to the connected vehicle, wherein the information identifies the goods or services provided by the one or more third party goods/service providers.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. At least one computer-readable medium, carrying instructions and excluding transitory signals, which when executed by at least one data processor, assists in performing actions for a wirelessly connected vehicle, the instructions comprising:
    transmitting, by a cloud-based network server and to a service provider capable of providing services to a driver of a connected vehicle, parameters associated with occurrence of an event associated with the connected vehicle,
        wherein the parameters include information associated with the occurrence of the event at the connected vehicle and information identifying a context for the occurrence of the event at the connected vehicle, and
        wherein the service provider is identified via information associated with multiple service providers stored within a database of a network carrier;
    receiving, at the cloud-based network server and from the service provider, information associated with one or more services to be provided in response to the occurrence of the event at the connected vehicle; and
    sending, via the cloud-based network server, the information associated with the one or more services to be provided from the service provider to the connected vehicle,
        wherein the information is presented, via a display device, to the driver of the connected vehicle, and
        wherein the instructions thereby provide a network of inclusivity to multiple service providers and facilitate information exchanges between connected vehicles and service providers associated with the network carrier.

2. The computer-readable medium of claim 1, wherein the information associated with the occurrence of the event includes information from the connected vehicle that indicates an abnormal operation of the connected vehicle for a certain period of time.

3. The computer-readable medium of claim 1, wherein the information associated with the occurrence of the event includes information from the connected vehicle that indicates an abnormal operation of one or more components of the connected vehicle for a certain period of time.

4. The computer-readable medium of claim 1, wherein the information is associated with paying for tolls, ferries, bridges, parking, or parking or other traffic violations.

5. The computer-readable medium of claim 1, further comprising:
    causing an action associated one or more traffic devices within a geographical area that includes the connected vehicle wherein the action includes modifying operation of the one or more traffic devices based on the occurrence of the event at the connected vehicle.

6. The computer-readable medium of claim 1, wherein transmitting the parameters includes:
    transmitting parameters associated with the occurrence of the event to one or more service providers that are located within a geographical area that is predicted to be a current travel destination of the connected vehicle.

7. The computer-readable medium of claim 1, wherein transmitting the parameters includes:
    transmitting parameters associated with the occurrence of the event to one or more service providers that are located along a route currently traveled by the connected vehicle.

8. The computer-readable medium of claim 1, wherein transmitting the parameters includes:
    transmitting parameters associated with the occurrence of the event to a first service provider capable of providing a service to the driver of the connected vehicle associated with the event at the connected vehicle; and
    transmitting parameters associated with the occurrence of the event at the connected vehicle to a second service provider capable of providing a service to the driver that is unconnected to the event at the connected vehicle.

9. The computer-readable medium of claim 8, wherein the first service provider is a car repair shop and the second service provider is a restaurant close to the repair shop.

10. The computer-readable medium of claim 1, wherein the event is a vehicle emissions metric falling below a minimum threshold, and wherein the information relates to repair shops capable of performing emissions testing.

11. The computer-readable medium of claim 1, wherein receiving information associated with the one or more services includes receiving information that identifies an incentive provided to the driver of the connected vehicle to utilize the one or more services provided from the service provider.

12. A computer-implementable method for performing actions for a wirelessly connected vehicle, the method comprising:
    transmitting, by a cloud-based network server and to a service provider capable of providing services to a driver of a connected vehicle, parameters associated with occurrence of an event associated with the connected vehicle,
        wherein the parameters include information associated with the occurrence of the event at the connected vehicle and information identifying a context for the occurrence of the event at the connected vehicle, and
        wherein the service provider is identified via information associated with multiple service providers stored within a database of a network carrier;
    receiving, at the cloud-based network server and from the service provider, information associated with one or more services to be provided in response to the occurrence of the event at the connected vehicle; and sending, via the cloud-based network server, the information associated with the one or more services to be provided from the service provider to the connected vehicle,
  wherein the information is presented via a display, to the driver of the connected vehicle, and
  wherein the method thereby provides a network of inclusivity to multiple service providers and facilitates information exchanges between connected vehicles and service providers associated with the network carrier.

13. At system for performing actions for a wirelessly connected vehicle, the system comprising:
  at least one hardware processor; and
  at least one memory, coupled to the at least on hardware processor and carrying instructions, which when executed by the at least on processor:
    transmit, by a cloud-based network server and to a service provider capable of providing services to a driver of a connected vehicle, parameters associated with occurrence of an event associated with the connected vehicle,
      wherein the parameters include information associated with the occurrence of the event at the connected vehicle and information identifying a context for the occurrence of the event at the connected vehicle, and
      wherein the service provider is identified via information associated with multiple service providers stored within a database of a network carrier;
    receive, at the cloud-based network server and from the service provider, information associated with one or more services to be provided in response to the occurrence of the event at the connected vehicle; and
    send, via the cloud-based network server, the information associated with the one or more services to be provided from the service provider to the connected vehicle,
      wherein the information is presented, via a display device, to the driver of the connected vehicle, and
      wherein the system thereby provides a network of inclusivity to multiple service providers and facilitate information exchanges between connected vehicles and service providers associated with the network carrier.

14. The system of claim 13, wherein the information associated with the occurrence of the event includes information from the connected vehicle that indicates an abnormal operation of the connected vehicle for a certain period of time.

15. The system of claim 13, wherein the information associated with the occurrence of the event includes information from the connected vehicle that indicates an abnormal operation of one or more components of the connected vehicle for a certain period of time.

16. The system of claim 13, wherein the information is associated with paying for tolls, ferries, bridges, parking, or parking or other traffic violations.

17. The system of claim 13, further comprising:
  causing an action associated one or more traffic devices within a geographical area that includes the connected vehicle, wherein the action includes modifying operation of the one or more traffic devices based on the occurrence of the event at the connected vehicle.

18. The system of claim 13, wherein the event is a vehicle emissions metric falling below a minimum threshold, and wherein the information relates to repair shops capable of performing emissions testing.

19. The system of claim 13, wherein receiving information associated with the one or more services includes receiving information that identifies an incentive provided to the driver of the connected vehicle to utilize the one or more services provided from the service provider.

* * * * *